US012059694B2

(12) United States Patent
Ding

(10) Patent No.: US 12,059,694 B2
(45) Date of Patent: Aug. 13, 2024

(54) PUMPING DEVICE

(71) Applicant: Yaowu Ding, Taixing (CN)

(72) Inventor: Yaowu Ding, Taixing (CN)

( * ) Notice: Subject to any disclaimer, the term of this patent is extended or adjusted under 35 U.S.C. 154(b) by 312 days.

(21) Appl. No.: 17/632,390

(22) PCT Filed: Sep. 29, 2019

(86) PCT No.: PCT/CN2019/108976

§ 371 (c)(1),
(2) Date: Jun. 6, 2022

(87) PCT Pub. No.: WO2021/022650

PCT Pub. Date: Feb. 11, 2021

(65) Prior Publication Data

US 2022/0288615 A1 Sep. 15, 2022

(30) Foreign Application Priority Data

Aug. 8, 2019 (CN) ......................... 201910730558.8

(51) Int. Cl.
*B05B 11/00* (2023.01)
*B05B 11/10* (2023.01)

(52) U.S. Cl.
CPC ......... *B05B 11/1077* (2023.01); *B05B 11/106* (2023.01)

(58) Field of Classification Search
CPC ............... B05B 11/1077; B05B 11/106; B05B 11/1074; B05B 11/1023; B05B 11/1001;
(Continued)

(56) References Cited

U.S. PATENT DOCUMENTS 5,013,303 A * 5/1991 Tamari ................ A61M 5/1483 604/131
5,664,703 A 9/1997 Reifenberger et al.
(Continued)

FOREIGN PATENT DOCUMENTS

CN 1230510 A 10/1999
CN 1576176 A 2/2005
(Continued)

OTHER PUBLICATIONS

International Search Report and Written Opinion dated Apr. 24, 202, for corresponding International Application No. PCT/CN2019/108976; International Filing Date: Sep. 29, 2019 consisting of 11 pages.

*Primary Examiner* — Bob Zadeh
(74) *Attorney, Agent, or Firm* — Weisberg I.P. Law, P.A.

(57) ABSTRACT

A pumping device (100), comprising a movable part and a fixed part. The movable part is capable of reciprocating relative to the fixed part, thereby dispensing, by means of a straw (30) connected to the fixed part, a product contained in a container (20). The pumping device (100) comprises elastic members (150, 250, 350, 550, 650, 850, 950, 1050), one end of each of the elastic members (150, 250, 350, 550, 650, 850, 950, 1050) is connected or supported on the movable part, and the other end of each of the elastic members (150, 250, 350, 550, 650, 850, 950, 1050) is connected or supported on the container (20), or is supported on the container (20) by means of the fixed part. The pumping device (100) having the described structure allows the elastic members (150, 250, 350, 550, 650, 850, 950, 1050) to be fabricated using plastic, and is also capable of obtaining the required elasticity.

16 Claims, 17 Drawing Sheets

(58) Field of Classification Search
CPC .. B05B 11/1042; B05B 11/1059; B65D 47/00
See application file for complete search history.

(56) References Cited

U.S. PATENT DOCUMENTS

| | | | | | |
|---|---|---|---|---|---|
| 5,673,824 | A * | 10/1997 | Evans | B05B 11/1077 222/321.9 |
| 2015/0136810 | A1 * | 5/2015 | Ding | B05B 11/1074 222/321.9 |

FOREIGN PATENT DOCUMENTS

| | | | | | |
|---|---|---|---|---|---|
| CN | 103029895 | A | | 4/2013 | |
| CN | 207482522 | U | * | 6/2018 | B05B 11/02 |
| CN | 207482522 | U | | 6/2018 | |
| CN | 209337265 | U | | 9/2019 | |
| CN | 209535894 | U | | 10/2019 | |
| EP | 2992967 | A1 | * | 3/2016 | B05B 1/34 |
| KR | 101897443 | B1 | * | 9/2018 | A61M 15/0013 |

* cited by examiner

PUMPING DEVICE

CROSS-REFERENCE TO RELATED APPLICATIONS

This application is a submission under 35 U.S.C. § 371 for U.S. National Stage Patent Application of, and claims priority to, International Application Number PCT/CN2019/108976 entitled PUMPING DEVICE filed Sep. 29, 2019, which is related to and claims priority to Chinese Application Serial No. 201910730558.8 filed Aug. 8, 2019, the entirety of all of which are incorporated herein by reference.

TECHNICAL FIELD

The present invention relates to the field of product dispensing, and in particular to a pumping device, such as a press pump and a manually operated pump, that may be used for dispensing flowable and semi-flowable materials such as a liquid and an emulsion from a container.

BACKGROUND ART

In containers for containing products such as sanitary wash supplies, medicines and foods, a pumping device is generally provided for dispensing the products from the containers. Conventional pumps available on the market are generally provided with elastic mechanisms made of metal, such as metal springs, to provide a biasing force to movable parts of the pumps, such as press heads, thereby imparting reciprocating capability to these movable parts.

It has been found during use that the elastic mechanisms made of metal have defects. First, the metal elastic members are immersed in the product for a long period of time, thereby causing rusting, and impurities generated due to the rusting may contaminate the liquid. Second, in a common product pumping device, except the metal elastic member, the remaining parts are generally made of plastics in order to reduce manufacturing costs. In this way, when the pumping device is recovered after using up, it is required to disassemble the pumping device, separate the metal elastic member from the other plastic parts, and recover them separately. This has an impact on recycling efficiency.

In order to solve this problem and improve the recycling efficiency of the pumping device, there is a need for a pumping device having a new structural design, which is capable of solving the problem that the metal elastic members are apt to rust to cause contamination, and is also capable of providing the same or similar elastic properties as a technical spring.

SUMMARY OF THE INVENTION

The present invention has been made on the basis of the above-described problem in the prior art. An object of the present invention to provide a pumping device of a novel structure, which allows efficient recycling. Further, the structure of the pumping device allows an elastic member to be made of plastics, and is capable of preventing elasticity reduction caused by the fact that the elastic member made of the plastics yields and deforms due to a long-time pressure.

The pumping device of the present invention has a movable part and a fixed part. The movable part is capable of reciprocating relative to the fixed part, thereby dispensing, by means of a straw connected to the fixed part, a product contained in a container. The pumping device comprises an elastic member, wherein one end of the elastic member is connected or supported on the movable part, and the other end of the elastic member is connected or supported on the container, or is supported on the container by means of the fixed part.

Therefore, in the pumping device having the above-described structure, the elastic member is directly or indirectly supported or connected to the container, and in particular can be supported on the container. This allows for greater flexibility in the size design of the elastic member and allows for the use of a larger sized elastic member. In this way, it can also ensure that desired elasticity is obtained in the case of the elastic element made of plastics.

Specifically, the movable part may comprise: a press head; and a piston rod connected to the press head; the fixed part may comprise: an engagement sleeve connected at a mouth of the container; a cylinder connected to the engagement sleeve, accommodated in the container and connected to the straw, the piston rod extending into the container; wherein one end of the elastic member abuts against or is fixed to the press head or the piston rod.

The other end of the elastic member abuts against or is fixed to one of: a shoulder of the container, an outer side surface of a bottom of the container, an inner surface of the bottom of the container, and a step portion formed inside the container.

In an embodiment, the other end of the elastic member is fixed to the mouth of the container, wherein the elastic member comprises an upper ring, a lower ring, and at least one elastic strip extending between the upper ring and the lower ring, and at least one fixed strip also extends upwards from the lower ring, the fixed strip being upwards connected to a fixed ring which is fixed at the mouth.

Preferably, the pumping device further comprises a releasing mechanism which is switchable between a released position and a preloading position, wherein the level of the elastic member when the releasing mechanism is in the released position is higher than the level of the elastic member when the releasing mechanism is in the preloading position. By providing the releasing mechanism, the elastic member may be in a released state when not in use, thereby avoiding or reducing yield deformation of the elastic member.

Preferably, the releasing mechanism comprises a synchronising collar, a first actuator is provided on the press head, a second actuator is provided on the synchronising collar, and the releasing mechanism is switched between the released position and the preloading position under the interaction between the first actuator and the second actuator.

Further, the first actuator is a first bump formed on the press head, a first bevel is formed on the first bump, the second actuator is a second bump formed on the synchronising collar, a second bevel is formed on the second bump, and the first bevel matches with the second bevel.

Preferably, the synchronising collar is sleeved on the engagement sleeve, wherein a slot is formed in an inner surface of the synchronising collar and a guide rail is formed on an outer surface of the engagement sleeve, and the guide rail matches with the slot, thus guiding movement of the synchronising collar relative to the engagement sleeve in the longitudinal direction of the pumping device and preventing rotational movement of the synchronising collar relative to the engagement sleeve.

In the pumping device of the present invention, the elastic member may be made of plastics.

In a specific preferred structure, the movable part comprises: a press head; and a piston rod connected to the press head, wherein the press head is provided with a pressing flange, and a user is capable of pressing the pressing flange with his/her finger to apply a pressure to the press head;

the fixed part comprises: an engagement sleeve connected at a mouth of the container; a cylinder connected to the engagement sleeve, accommodated in the container and connected to the straw, the piston rod extending into the container;

wherein one end of the elastic member abuts against or is fixed to the press head or the piston rod, and the other end abuts against or is fixed to the engagement sleeve.

Further, a guide block is provided on the elastic member, a recess is formed in the engagement sleeve, and the elastic member is rotatable between the released position in which the guide block is located within the recess and the preloading position in which the guide block exits the recess such that the distance between the upper end and the lower end of the elastic member is reduced. Thus, preloading and releasing functions of the elastic member are achieved.

In addition, the elastic member is formed with a synchronising sleeve, and the press head comprises a lower press head ring sleeved on the synchronising sleeve, wherein raised ribs are formed on one of an outer surface of the synchronising sleeve and an inner surface of the lower press head ring, and grooves are formed in the other one of the outer surface of the synchronising sleeve and the inner surface of the lower press head ring, and the raised ribs and the grooves match with each other such that the elastic member is rotatable together with the press head.

The elastic member may be arranged outside the press head and/or the engagement sleeve, or may be hidden inside the press head and/or the engagement sleeve. For example, a lower sleeve may be formed at a lower portion of the press head, and an upper sleeve is formed at an upper portion of the engagement sleeve, the lower sleeve and the upper sleeve match with each other to form an internal space in which the elastic member is accommodated.

BRIEF DESCRIPTION OF THE DRAWINGS

Non-limiting preferred embodiments of the present invention are illustrated in the accompanying drawings, and the features and advantages of the present invention will become more apparent in conjunction with the accompanying drawings. In the drawings.

DETAILED DESCRIPTION OF THE EMBODIMENTS

Figure 1:
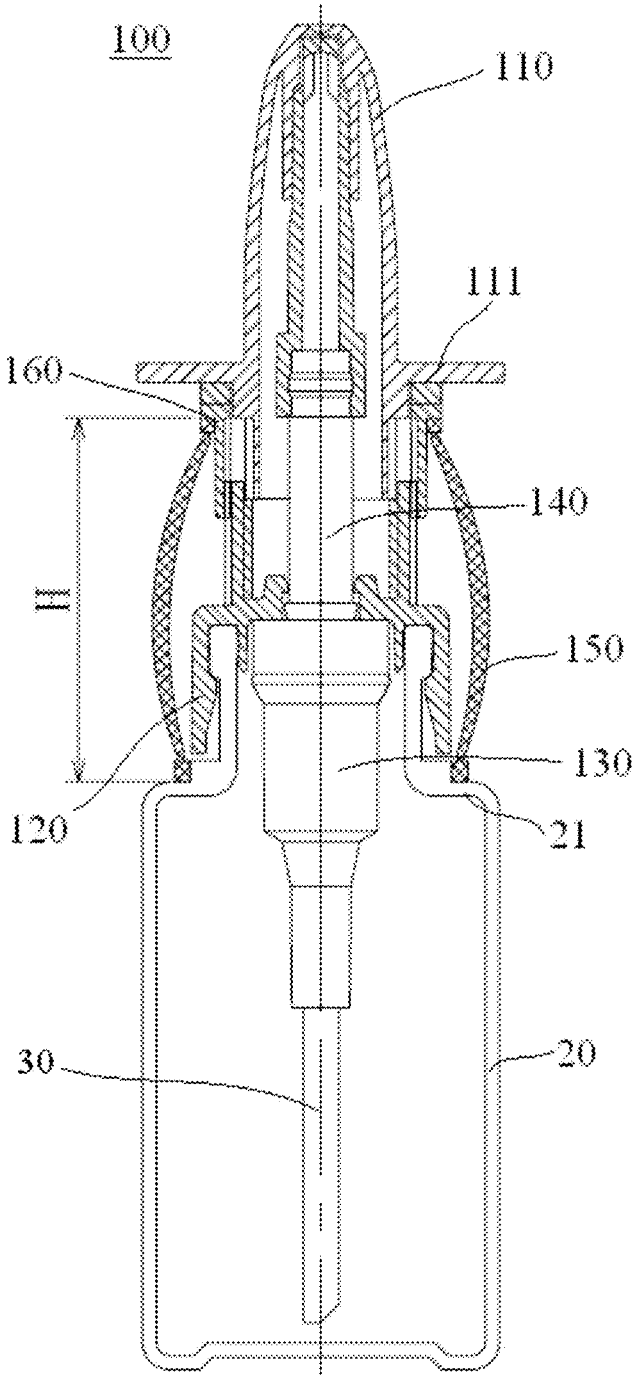
FIG. 1 shows a cross-sectional view of a pumping device of a first embodiment of the present invention, with the pumping device in a released state.

Specific embodiments of the present invention will be described below with reference to the accompanying drawings. It should be understood that only preferred embodiments of the present invention are shown in these accompanying drawings and are not intended to constitute a limitation to the scope of the present invention. Various obvious modifications, variations and equivalent substitutions to the present invention can be made by those skilled in the art based on the embodiments shown in the drawings, and the technical features in the described embodiments can be arbitrarily combined without causing contradictions. These all fall within the scope of protection of the present invention.

In the disclosure of the present invention, the terms such as “upper” and “lower” used to indicate directions or orientations are according to the orientation of the device in use.

First Embodiment

Figure 2:
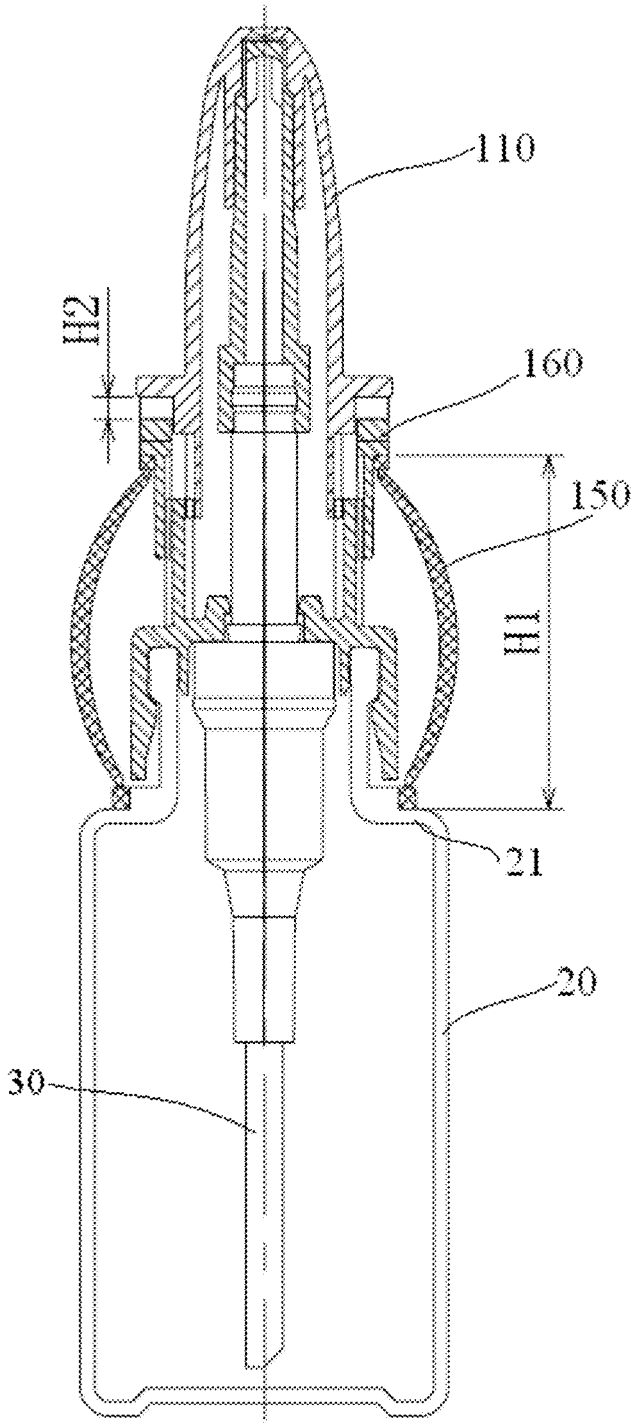
FIG. 2 shows another cross-sectional view of the pumping device shown in FIG. 1, with the pumping device in a preloading position.
Figure 3:
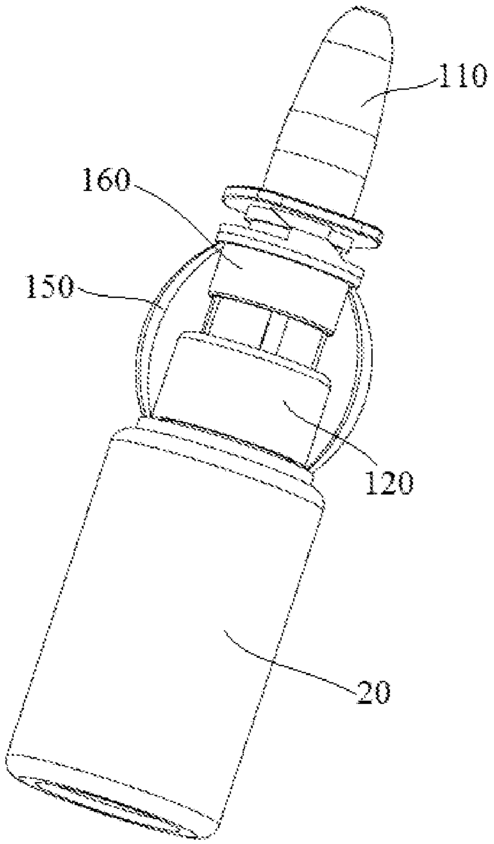
FIG. 3 shows a perspective view of the pumping device shown in FIG. 1.

FIGS. 1 and 2 show a pumping device 100 of a first embodiment of the present invention, wherein FIG. 1 shows a released position of the pumping device 100, FIG. 2 shows a preloading position of the pumping device 100, and FIG. 3 shows a perspective view of the pumping device 100.

As shown in the figures, the pumping device 100 is mounted on a container 20. The pumping device 100 includes a press head 110 which is relatively movably connected to an engagement sleeve 120. The engagement sleeve 120 is fixedly connected at a mouth of the container 20, and a cylinder 130 of the pumping device 100 is connected to the engagement sleeve 120. A piston rod 140 is connected to the press head 110, a piston (not shown) is connected to the piston rod 140, and an end of the piston rod 140 connected to the piston extends into the cylinder 130.

The pumping device 100 of the present invention further comprises an elastic member 150, one end of the elastic member 150 is a fixed end and is supported on the container 20, and the other end thereof is a movable end and is supported on a movable part composed of the press head 110, etc.

With respect to the pumping device 100 configured as shown in FIGS. 1 and 2, the piston rod 140 and the piston connected thereto move downwards in the cylinder 130 by pressing the press head 110, thereby pumping out the product in the container. After the pressure applied to the press head 110 is removed, the elasticity of the elastic member 150 returns the press head 110 upwards to its original position together with the piston rod 140 and the piston for the next dispensing of the product. In the present invention, the elastic member 150 may also be made of plastics so that it is not necessary to separate the elastic member from the rest of the pumping device 100 during recycling. The specific structure of the elastic member 150 will be described in detail below.

Preferably, the pumping device 100 further includes a releasing mechanism which is movable between the released position in which the elastic member 150 is in a released state and a preloading position in which the elastic member 150 is slightly loaded. In the exemplary structure shown in FIGS. 1-3, the releasing mechanism includes a synchronising collar 160 arranged in contact with the press head 110.

Preferred structures of constituent parts of the pumping device 100 will be described separately below.

Figure 4:
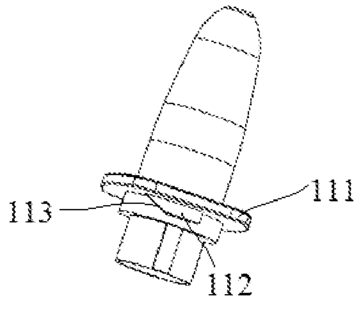
FIG. 4 shows a perspective view of a press head of the pumping device of the first embodiment.

FIG. 4 shows a perspective view of the press head 110 of the pumping device 100. The press head 110 has a pressing flange 111, and when the pumping device 100 is operated, a user may press the pressing flange 111 with his/her finger to apply a force so as to press down the press head 110. A lower side of the pressing flange 111 is provided with a first bump 112, and a first bevel 113 is formed on the first bump 112.

Figure 5:
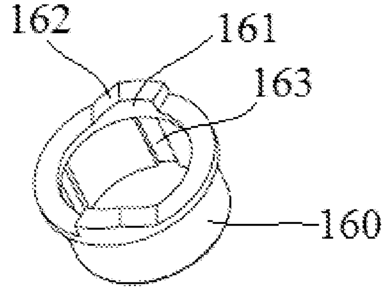
FIG. 5 shows a perspective view of a synchronising collar of the pumping device of the first embodiment.

Correspondingly, FIG. 5 shows a synchronising collar 160 arranged below the pressing flange 111. A second bump 161 is provided on an upper surface of the synchronising collar 160 facing the pressing flange 111, and a second bevel 162 is formed on the second bump 161. The second bevel 162 may match with the first bevel 113 on the first bump 112. As the press head 110 rotates relative to the synchronising collar 160, the first bevel 113 will interact with the second bevel 162, thereby changing the distance between the synchronising collar 160 and the pressing flange 111.

Figure 6:
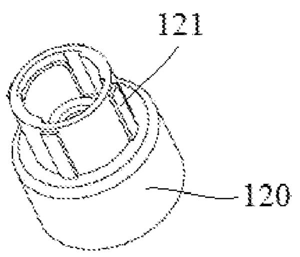
FIG. 6 shows a perspective view of an engagement sleeve of the pumping device of the first embodiment.

FIG. 6 shows a perspective view of the engagement sleeve 120. At least one guide rail 121 is formed on at least an outer surface of an upper portion of the engagement sleeve 120, at least one slot 163 is formed in an inner surface of the synchronising collar 160, and the slot 163 matches with the guide rail 121 such that the synchronising collar 160 can slide on a corresponding portion of the engagement sleeve 120 without rotating around the engagement sleeve 120.

Figure 7:
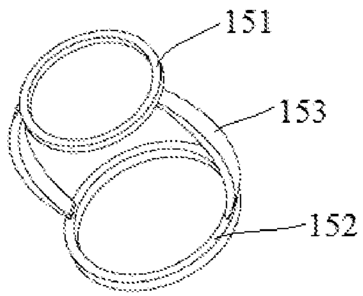
FIG. 7 shows a perspective view of an elastic member of the pumping device of the first embodiment.

FIG. 7 shows a perspective view of the elastic member 150. The elastic member 150 includes an upper ring 151 and a lower ring 152, and at least one elastic strip 153 is connected between the upper ring 151 and the lower ring 152. As described above, the elastic member 150 configured as shown in FIG. 7 may be made of plastics, so that the problems of a conventional metal elastic member can be prevented.

Turning back to FIGS. 1-3, it is shown that the upper ring 151 of the elastic member 150 in the pumping device 100 of the first embodiment abuts against the synchronising collar 160, and the lower end of the elastic member is supported on a shoulder 21 of the container 20.

When the press head 110 is rotated from the released position shown in FIG. 1, the press head 110 will rotate relative to the engagement sleeve 120, while the synchronising collar 160 remains fixed relative to the engagement sleeve 120 in a direction of rotation due to the interaction between the guide rail 121 and the slot 163. In this way, a relative action occurs between the first bevel 113 and the second bevel 162 to push down the synchronising collar 160 away from the press head 110 and into the preloading position shown in FIG. 2. In the preloading position, since the synchronising collar 160 is pushed down by a distance H2 away from the press head 110, the level of the elastic member 150 changes from H in FIG. 1 to H1 in FIG. 2, wherein H1 is less than H, and accordingly the elastic member 150 is slightly loaded.

After using up, the press head 110 can be rotated in a reverse direction to go back to the state shown in FIG. 1, thereby bring the elastic member 150 back to the released state.

Second Embodiment

Figure 8:
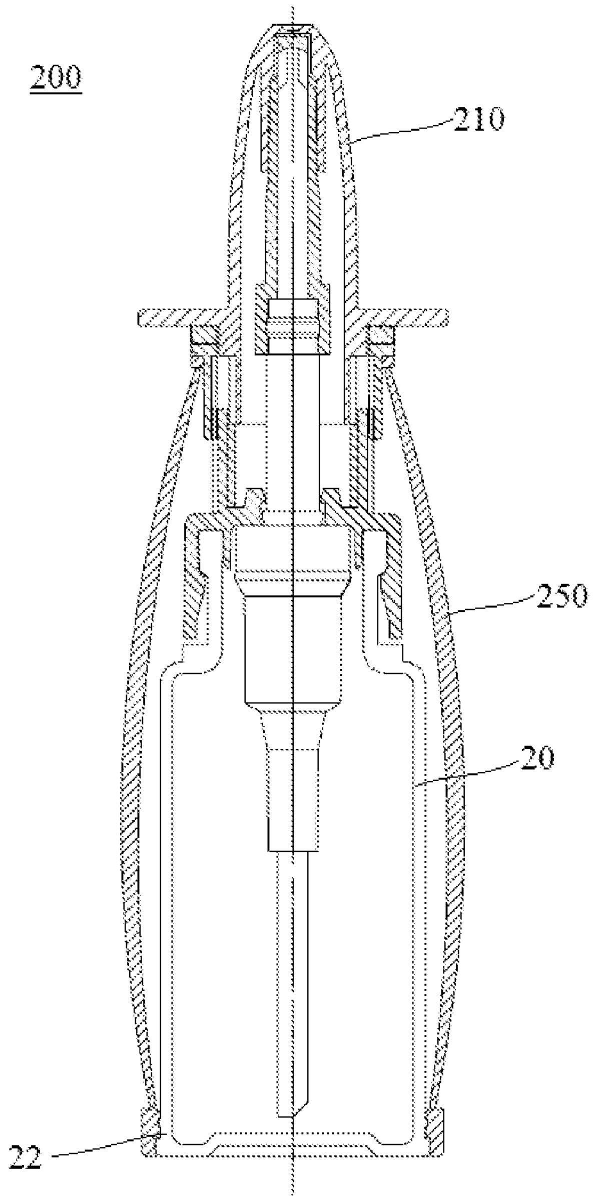
FIG. 8 shows a cross-sectional view of a pumping device of a second embodiment of the present invention.

FIG. 8 shows a pumping device 200 of a second embodiment of the present invention. The similarities of the structure in the second embodiment as the structure in the first embodiment will not be described in detail herein, and the following description will mainly focus on the features of the second embodiment that are different from those of the first embodiment.

As shown in FIG. 8, the pumping device 200 of the second embodiment includes an elastic member 250, and the elastic member 250 also includes a plurality of elastic strips 253. One end of the elastic member 250 abuts against a movable part such as the press head 210.

The other end of the elastic member 250 is supported on the outer side of the bottom of the container 20, and particularly on an outer side surface 22 of the bottom of the container 20. For example, an external thread may be formed on the outer side surface 22 of the bottom of the container 20, and the lower end of the elastic member 250 may be provided with a part with an internal thread, so that the lower end of the elastic member 250 is fixed to the outside of the bottom of the container 20 in a threaded connection manner. Alternatively, the lower end (namely, the fixed end) of the elastic member 250 may be fixed to the outside of the bottom of the elastic member 250 in other manners.

Third Embodiment

Figure 9:
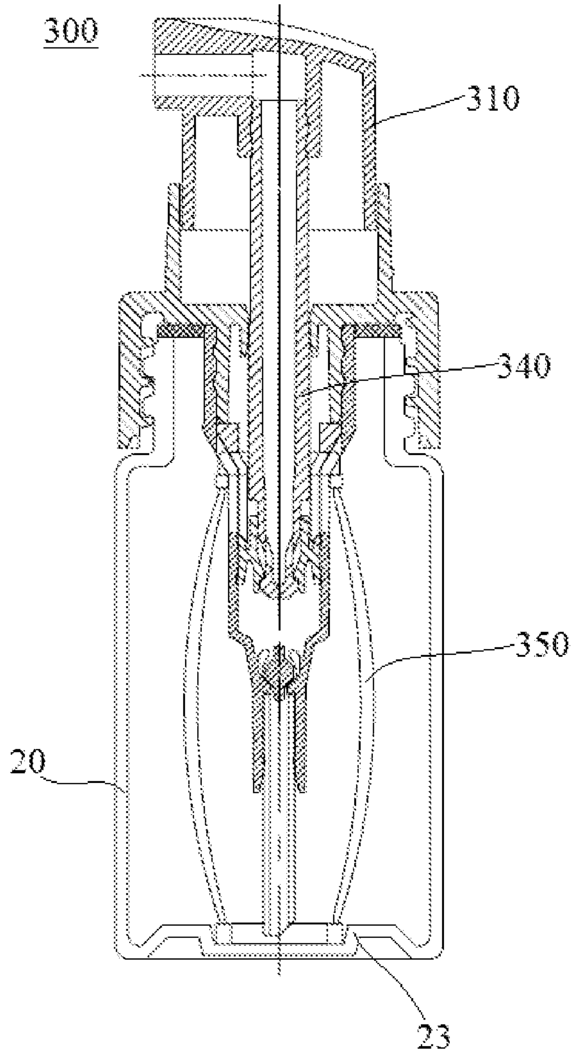
FIG. 9 shows a cross-sectional view of a pumping device of a third embodiment of the present invention.

FIG. 9 shows a pumping device 300 of a third embodiment of the present invention. The similarities of the structure in the third embodiment as the structures in the first and second embodiments will not be described in detail herein, and the following description will mainly focus on the features of the third embodiment that are different from those of the first and second embodiments.

As shown in FIG. 9, the pumping device 300 includes a press head 310, a piston rod 340 is connected to the press head 310 and moves along with the press head 310. The movable end (the upper end in the figure) of the elastic member 350 abuts against or is fixed to the piston rod 340, and the fixed end (the lower end in the figure) of the elastic member 350 is fixed to the inner surface of the bottom of the container 20.

In this embodiment, the movable end of the elastic member 350 may also abut against or be fixed to other movable parts, for example, the press head 310 as in the first embodiment.

Fourth Embodiment

Figure 10:
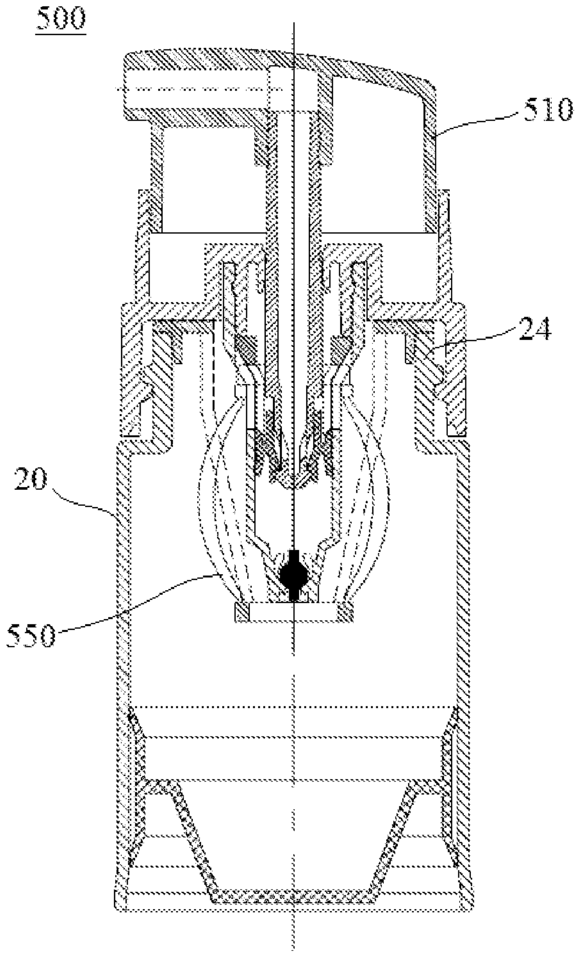
FIG. 10 shows a cross-sectional view of a pumping device of a fourth embodiment of the present invention.

FIG. 10 shows a pumping device 500 of a fourth embodiment of the present invention. The similarities of the structure in the fourth embodiment as the structures in the first through third embodiments will not be described in detail herein, and the following description will mainly focus on the features of the fourth embodiment that are different from those of the first through third embodiments.

As shown in FIG. 10, the pumping device 500 includes a press head 510, a piston cap 540 is connected to the press head 510, and a movable end of an elastic member 550 abuts against or is fixed to the piston rod 540. A fixed end of the elastic member 550 in this fifth embodiment is connected to a mouth 24 of the container 20.

Figure 11:
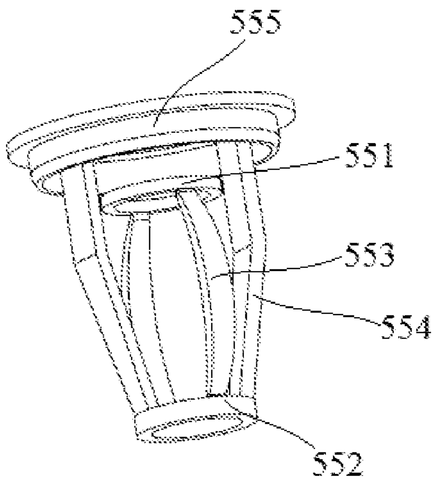
FIG. 11 shows a perspective view of an elastic member of the pumping device shown in FIG. 10.

Particularly, as shown in FIG. 11, in addition to an elastic strip 553 between an upper ring 551 and a lower buffer 552, at least one fixed strip 555 extending upwards is further connected to a lower end of the elastic member 550. The other end of the fixed strip 555 is connected into a fixed buffer 554, and the fixed buffer 554 is fixed at the mouth 24 of the container 20.

Thus, as shown in the cross-sectional view of FIG. 10, the lower end of the elastic member 550 is in a suspended state and is held by the fixed ring 554 fixed to the mouth 24 and the fixed strip 555 extending downwards from the fixed ring 554.

Fifth Embodiment

Figure 12:
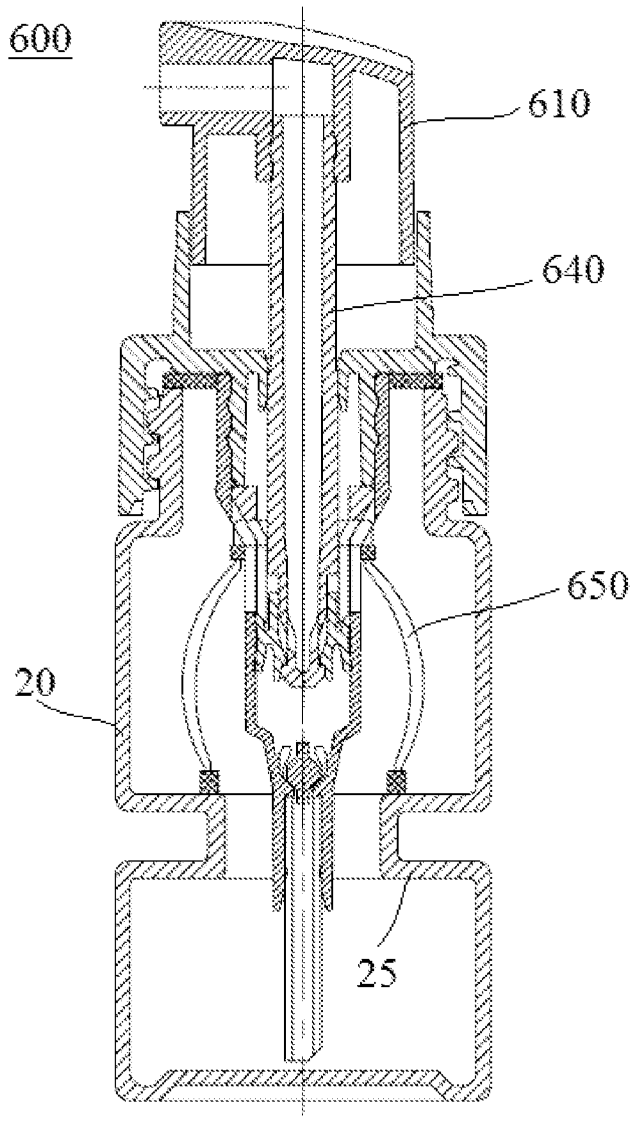
FIG. 12 shows a cross-sectional view of a pumping device of a fifth embodiment of the present invention.

FIG. 12 shows a pumping device 600 of a fifth embodiment of the present invention. The similarities of the structure in the fifth embodiment as the structures in the first through fifth embodiments will not be described in detail herein, and the following description will mainly focus on the features of the fifth embodiment that are different from those of the first through fifth embodiments.

As shown in FIG. 12, the similarities as in the previous fourth embodiment lie in that the pumping device 600 further includes a press head 610, a piston rod 640 is connected to the press head 610, and a movable end of an elastic member 650 abuts against or is fixed to the piston rod 640.

A step portion 25 is formed inside the container 20, and a fixed end of the elastic member 650 abuts against the step portion 25.

Sixth Embodiment

FIGS. 13-20*d* show a pumping device 800 of a sixth embodiment of the present invention. The similarities of the structure in the sixth embodiment as the structures in the first through fifth embodiments will not be described in detail herein, and the following description will mainly focus on the features of the sixth embodiment that are different from those of the first through fifth embodiments.

Figure 13:
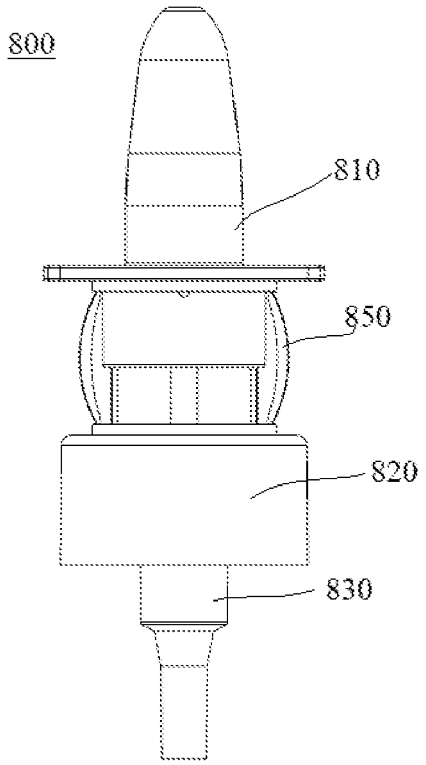
FIG. 13 shows a front view of a pumping device of a sixth embodiment of the present invention.
Figure 14:
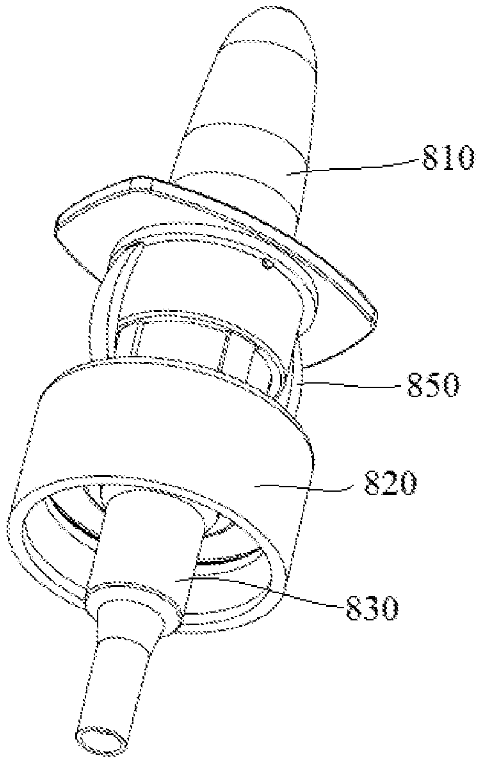
FIG. 14 shows a perspective view of the pumping device shown in FIG. 13.
Figure 15:
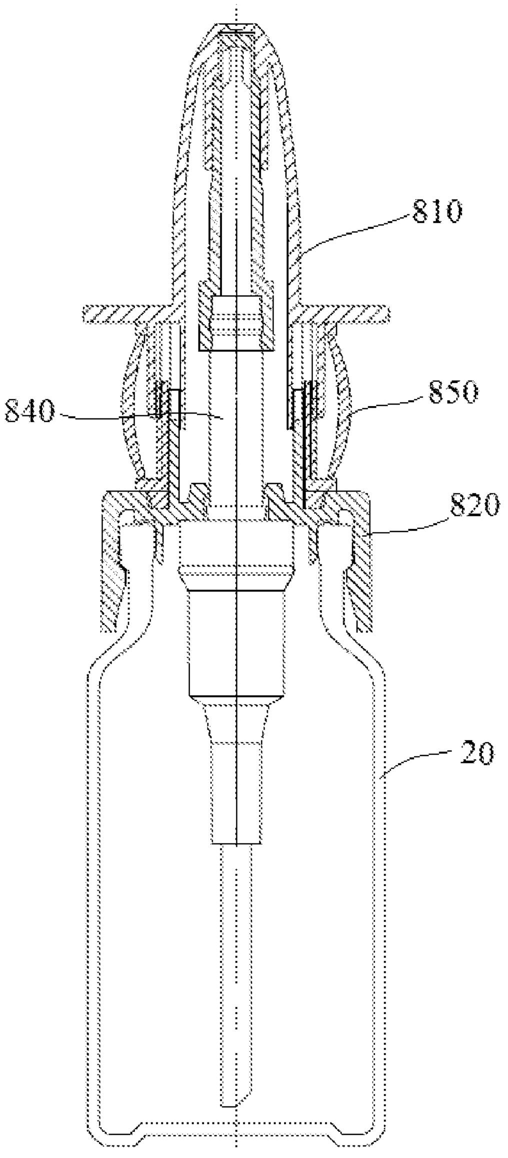
FIG. 15 shows a cross-sectional view of the pumping device shown in FIG. 13 mounted on a container, with the pumping device in a released position.
Figure 16:
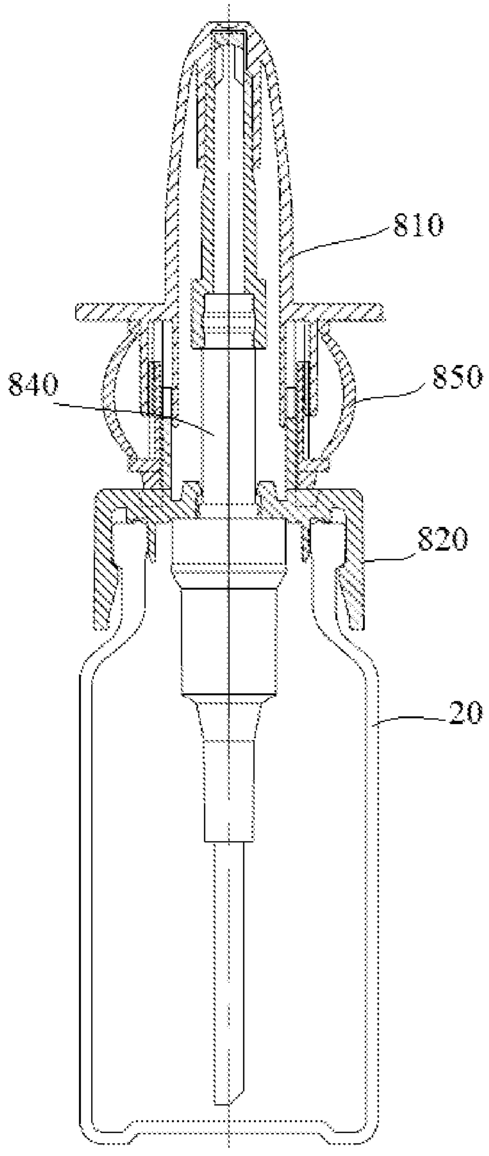
FIG. 16 shows another cross-sectional view of the pumping device shown in FIG. 13 mounted on the container, with the pumping device in a preloading position.

FIGS. 13 and 14 respectively show a front view and a perspective view of the pumping device 800 of the sixth embodiment, and FIGS. 15 and 16 show cross-sectional views of the pumping device 800 mounted on the container 20, wherein the pumping device 800 is in a released position and a preloading position respectively.

As shown, like the pumping device 100 of the first embodiment, the pumping device 800 of the sixth embodiment is manually operated and includes a press head 810 and an engagement sleeve 820, a flange is formed on the press head 810, and the user may apply a force to the flange with one hand to press the press head 810. A piston rod 840 (see FIGS. 15 and 16) is connected to the press head 810, an air cylinder 830 is connected to the engagement sleeve 820, and the engagement sleeve 820 is connected to the container 20, for example, fits to the mouth of the container 20. The pumping device 800 further includes an elastic member 850.

The structure of the elastic member 850 of the pumping device 800 of the sixth embodiment is clearly shown in FIGS. 18*a*-18*d*. The elastic member 850 includes an upper ring 851, a lower ring 852, and at least one, preferably a plurality of elastic strips 853 connected between the upper ring 851 and the lower ring 852. The elastic member 850 further includes a synchronising sleeve 854, the synchronising sleeve 854 may be integrally formed on the elastic member 850, for example, formed integrally with the lower ring 852 of the elastic member 850, or may be separately formed and then is fixedly mounted to the elastic member 850.

Turning back to FIGS. 15 and 16, it may be seen therefrom that in a mounted state, the lower end of the press head 810 is sleeved on the piston rod 840 of the elastic member 850, the upper ring 851 of the elastic member 850 abuts against the press head 810, and the lower ring 852 is in contact with the engagement sleeve 820 and is supported on the container 20 by means of the engagement sleeve 820.

Figure 19A:
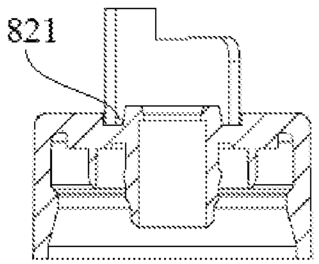
FIGS. 19*a*-19*c* respectively show a cross-sectional view, a perspective view and a top view of an engagement sleeve of the pumping device of the sixth embodiment.
Figure 19B:
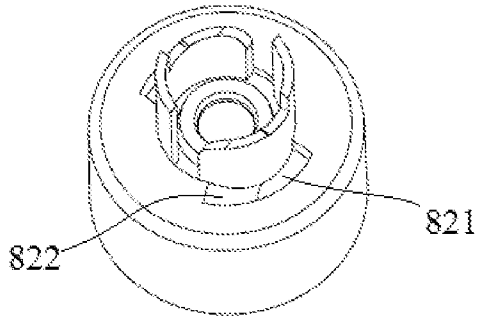
Figure 19C:
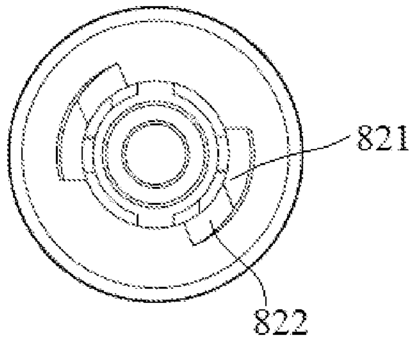
Figure 20A:
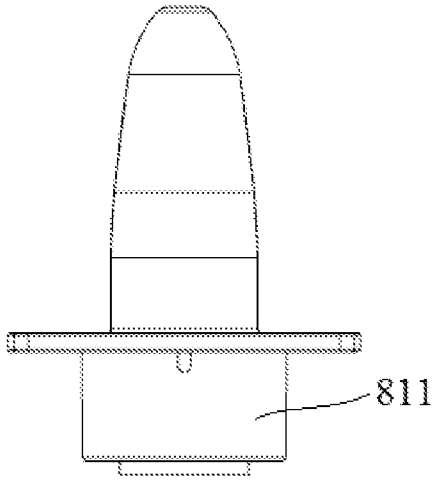
FIGS. 20*a*-20*d* respectively show a front view, a cross-sectional view, a bottom view, and a bottom perspective view of a press head of the pumping device of the sixth embodiment.
Figure 20B:
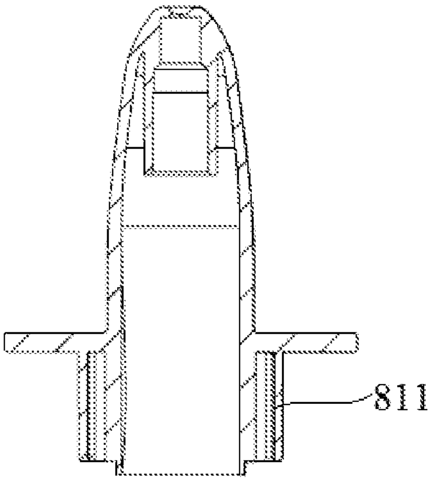
Figure 20C:
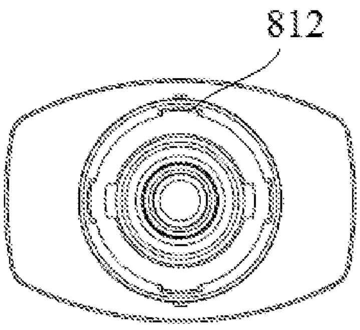
Figure 20D:
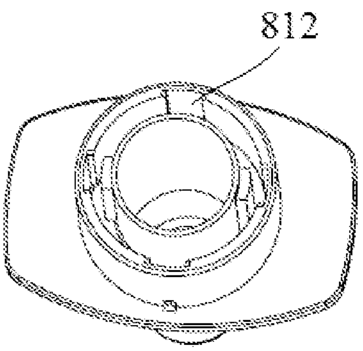

FIGS. 19*a*-19*c* respectively show a cross-sectional view, a perspective view and a top view of the elastic member 850. It can be seen therefrom that a recess 821 is formed in the engagement sleeve 820, and a guide bevel 822 is included in the recess 821. Accordingly, a guide block 855 is provided below the lower ring 852 of the elastic member 850, and the guide block 855 includes a bevel 857 corresponding to the guide bevel 822.

Preloading of the elastic member 850 may be achieved by means of the matching between the guide block 855 and the recess 821, as described in more detail below.

Figure 18A:
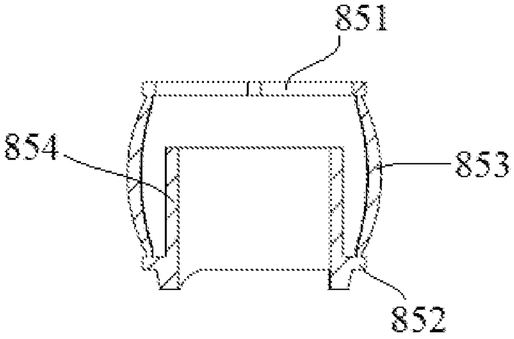
FIGS. 18*a*-18*d* respectively show a cross-sectional view, a bottom view, a top perspective view, and a bottom perspective view of the elastic member of the pumping device of the sixth embodiment.
Figure 18B:
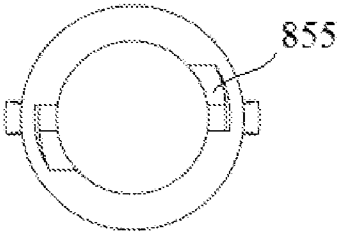
Figure 18C:
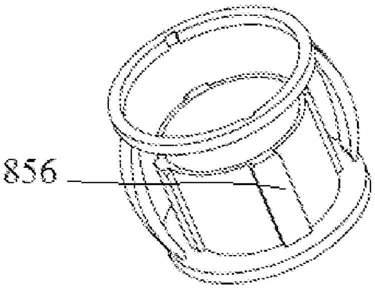
Figure 18D:
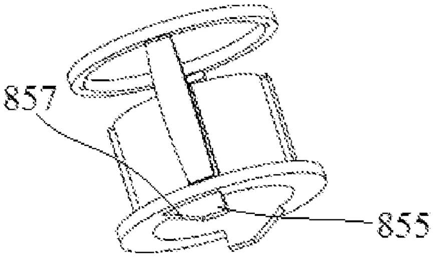

Further, as shown more clearly in FIG. 18*c*, at least one raised rib 856 is formed on an outer surface of the synchronising sleeve 854, and correspondingly, as shown in FIGS. 20*a*-20*d*, a groove 812 is formed in an inner surface of a lower press head ring 811 of the press head 810. The elastic member 850 is rotatable together with the press head 810 under the interaction between the raised rib 856 and the groove 812.

The arrangement positions of the groove and the raised rib may be interchanged herein, which is also within the scope of the present invention, namely, the raised rib may be formed on the inner surface of the lower press head ring 811, and the groove may be correspondingly formed in the outer surface of the synchronising sleeve 854.

Figure 17:
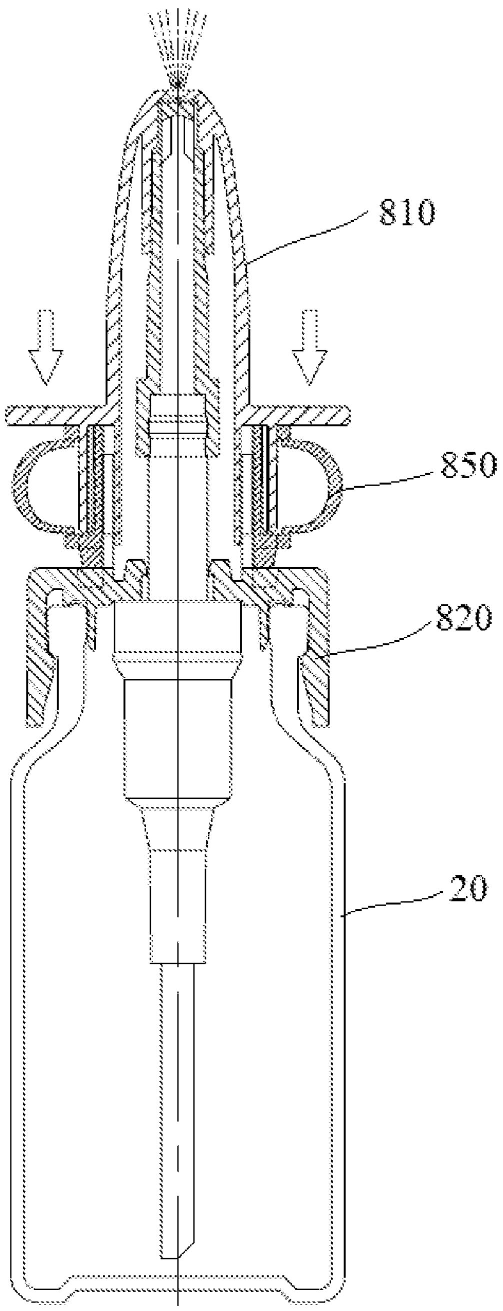
FIG. 17 shows a further cross-sectional view of the pumping means of the sixth embodiment, with the pumping device being pressed to dispense a product in the container.

The action principle of the pumping device 800 of the sixth embodiment will be described below with reference to FIGS. 15-17.

When leaving a factory, the pumping device 800 is in the released position as shown in FIG. 15, and the guide block 855 on the elastic member 850 is located in the recess 821 of the engagement sleeve 820 at this time, so that the distance between the upper ring 851 and the lower ring 852 of the elastic member 850 is larger and the elastic member 850 is in a relaxed state.

Before operating the pumping device 800 to pump the product in the container 20, the user first rotates the press head 810, for example, by 90 degrees, to rotate the elastic member 850 together therewith. In this way, under the interaction between the guide bevel 822 in the recess 821 of the engagement sleeve 820 and the bevel 857 on the guide block 855 of the elastic member 850, the guide block 855 rises out of the recess 821 such that the distance between the upper ring 851 and the lower ring 852 of the elastic member 850 is decreased, and the elastic member 850 then enters the preloading position as shown in FIG. 16.

In the preloading position, the user may press down the press head 810 to pump out the product in the container 20.

After using up, the press head 810 may optionally be rotated reversely to bring the elastic member 850 back to the released position.

Seventh Embodiment

Figure 21:
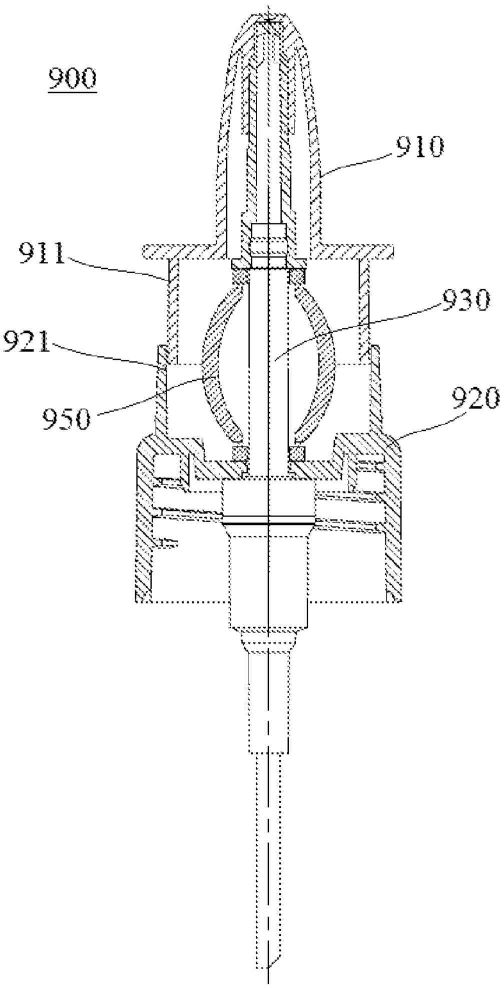
FIG. 21 shows a cross-sectional view of a pumping device of a seventh embodiment of the present invention.
Figure 22:
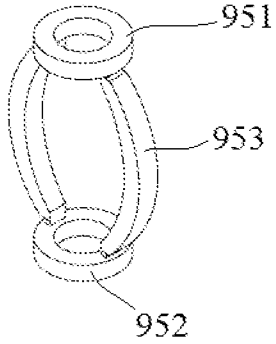
FIG. 22 shows a perspective view of the elastic member in the pumping device of FIG. 21.

FIGS. 21 and 22 show a pumping device 900 of a seventh embodiment of the present invention. The similarities of the structure in the seventh embodiment and the structures in the first through sixth embodiments will not be described in detail herein, and the following description will mainly focus on the features of the seventh embodiment that are different from those of the first through sixth embodiments.

As shown in FIG. 21, like the pumping devices of the first and sixth embodiments, the pumping device 900 of the seventh embodiment is manually operated and includes a press head 910 and an engagement sleeve 920. The pumping device 900 of the seventh embodiment is different in that the elastic member 950 thereof is provided inside the press head 910.

Particularly, as shown in FIG. 21, the press head 910 has a lower sleeve 911, and the engagement sleeve 920 is formed with an upper sleeve 921. The lower sleeve 911 and the upper sleeve 921 match with each other to form an internal space in which the elastic member 950 is arranged.

Similar to the first embodiment, the elastic member 950 includes an upper ring 951, a lower ring 952, and an elastic strip 953 therebetween, as shown in the perspective view of FIG. 22. Turning back to FIG. 21, the figure illustrates that the upper ring 951 of the elastic member 950 is supported on a flange on a piston rod 930. Alternatively, in an implementation structure not shown, the upper ring 951 may be supported at any suitable position within the lower sleeve 911 of the press head 910, for example, on a top plate of the lower sleeve 911.

As for the lower ring 952 of the elastic member 950, in the structure shown in FIG. 21, the lower ring is supported on the engagement sleeve 920, for example, on a bottom plate of the upper sleeve 921 of the engagement sleeve 920, so as to be indirectly supported on the container by means of the engagement sleeve 920. Alternatively, the lower ring 952 may be directly supported on the container, for example, on a convex ring formed on an inner surface of the mouth of the container.

Eighth Embodiment

FIGS. 23-25*b* show a pumping device 1000 of an eighth embodiment of the present invention. The similarities of the structure in the eighth embodiment and the structures in the first through seventh embodiments will not be described in detail herein, and the following description will mainly focus on the features of the eighth embodiment that are different from those of the first through seventh embodiments.

Figure 23:
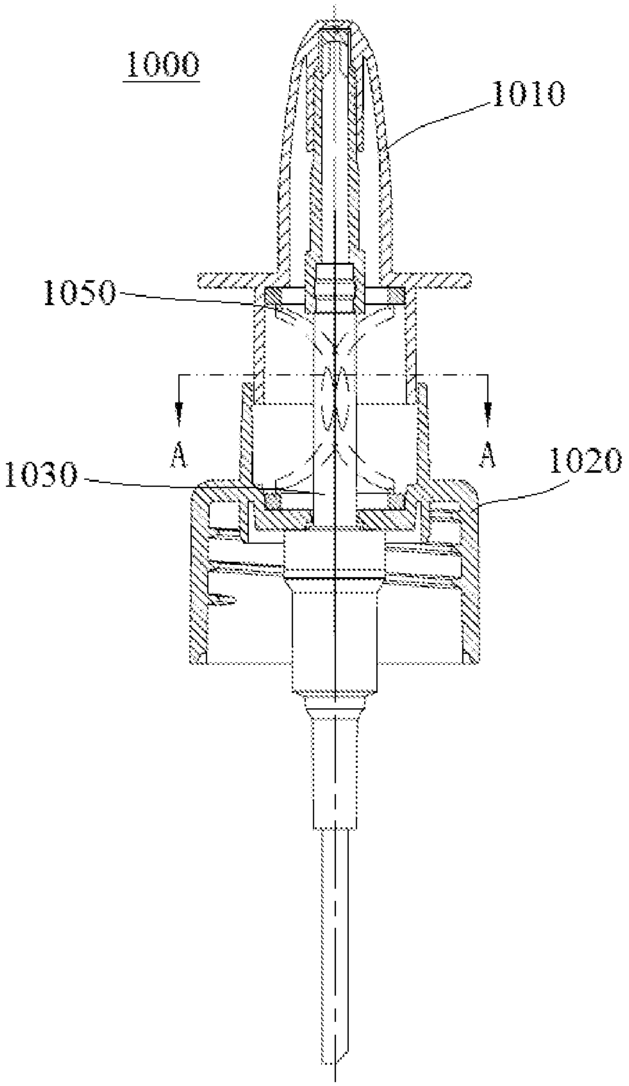
FIG. 23 shows a cross-sectional view of a pumping device of an eighth embodiment of the present invention.

As shown in FIG. 23, the pumping device 1000 in the eighth embodiment is also manually operated and is similar to the seventh embodiment, the elastic member 1050 of the pumping device 1000 is also accommodated inside the press head 1010, and an upper ring 1051 thereof is supported on a press head 1010, or may be supported on a flange formed on a piston rod 1030 as in the ninth embodiment, and a lower ring 1052 is supported on an engagement sleeve 1020.

Figure 24A:
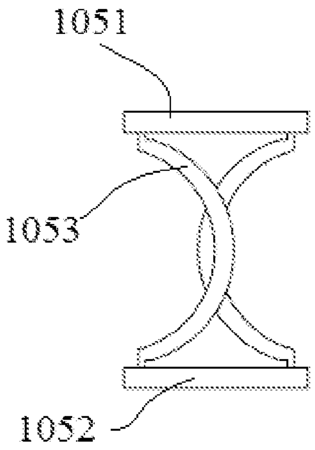
FIG. 24*a* shows a side view of the elastic member in the pumping device of FIG. 23.
Figure 24B:
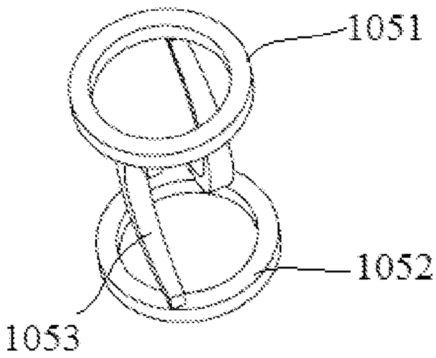
FIG. 24*b* shows a perspective view of the elastic member.

The difference lies in that two or more elastic strips 1053 included in the elastic member 1050 of the eighth embodiment are located on different planes. This is illustrated in FIGS. 24*a* and 24*b*. In other words, the elastic strips 1053 of the elastic member 1050 respectively deform in different planes.

Figure 25A:
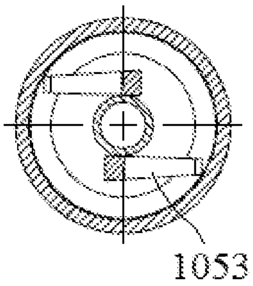
FIG. 25*a* shows a cross-sectional view taken along line A-A of FIG. 23, with a structure of an elastic member is shown.
Figure 25B:
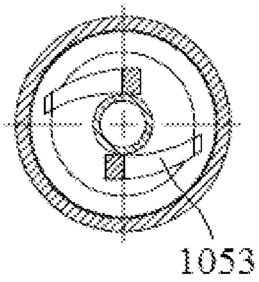
FIG. 25*b* shows a cross-sectional view taken along line A-A of FIG. 23 including another elastic member structure.

FIGS. 25*a* and 25*b* respectively show cross-sectional views of the elastic member 1050 taken along line A-A in FIG. 23, with the elastic members 1050 of two structures being respectively illustrated. The cross section of the elastic strip 1053 of the elastic member 1050 shown in FIG. 25*a* is flat and straight, and the cross section of the elastic strip 1053 of the elastic member 1050 shown in FIG. 25*b* is arc-shaped.

The preferred embodiments of the present invention are described above. On this basis, those skilled in the art may make obvious variations and modifications.

In the structure shown in the figures, the elastic member includes an upper ring and a lower ring. However, one of the upper ring and the lower ring may be omitted, in which case the respective ends of the elastic strip are directly connected to the movable part or the container.

In the first embodiment, the elastic member 150 and the synchronising collar 160 are two parts formed separately, but the elastic member 150 may alternatively be formed integrally with the synchronising collar.

In the above description of the disclosed embodiments, the upper ring and the lower ring (or the upper end and the lower end) of the elastic member are supported or connected in corresponding parts, including the case where the upper ring and the lower ring of the elastic member are integrally formed on the corresponding parts.

In the embodiments disclosed above, the press head, the piston rod, etc. are described as the movable parts of the pumping device, and the cylinder, the engagement sleeve, etc. are described as the fixed parts of the pumping device. It will be appreciated by those skilled in the art that other movable and fixed parts may be further included for different types of pumping devices, and that the same part may be a movable part in one type of pumping device but may be a fixed part in another type of pumping device. For example, similarly, the cylinder may be either a fixed part or a movable part. Correspondingly, if the cylinder is the fixed part, the piston and the piston rod are movable parts, and if the cylinder is the movable part, the piston and the piston rod are correspondingly fixed parts.

In the embodiments disclosed above, the straw 30 is shown as an integral part. The straw may be made by means of injection molding, or may also be made by means of extrusion, blow molding, etc. Furthermore, the straw may further include a plurality of portions assembled together.

The invention claimed is:

1. A pumping device, comprising a movable part and a fixed part, the movable part being capable of reciprocating relative to the fixed part, thereby dispensing, by means of a straw connected to the fixed part, a product contained in a container, characterized in that the pumping device comprises an elastic member, one end of the elastic member is connected to the movable part, and the other end of the elastic member is connected or supported on the container, the movable part comprising:

a press head; and a piston rod connected to the press head;

the fixed part comprises: an engagement sleeve connected at a mouth of the container;

a cylinder connected to the engagement sleeve, accommodated in the container and connected to the straw, the piston rod extending into the container; and the one end of the elastic member abuts against or is fixed to the press head or the piston rod.

2. The pumping device of claim 1, wherein the pumping device further comprises a releasing mechanism which is switchable between a released position and a preloading position, wherein a level of the elastic member when the releasing mechanism is in the released position is higher than the level of the elastic member when the releasing mechanism is in the preloading position.

3. The pumping device of claim 1, wherein the other end of the elastic member abuts against or is fixed to one of:

a shoulder of the container, an outer side surface of a bottom of the container, an inner surface of the bottom of the container, and a step portion formed inside the container.

4. The pumping device of claim 3, wherein the pumping device further comprises a releasing mechanism which is switchable between a released position and a preloading position, wherein a level of the elastic member when the releasing mechanism is in the released position is higher than the level of the elastic member when the releasing mechanism is in the preloading position.

5. The pumping device of claim 1, wherein the other end of the elastic member is fixed to the mouth of the container, wherein the elastic member comprises an upper ring, a lower ring, and at least one elastic strip extending between the upper ring and the lower ring, and at least one fixed strip also extends upwards from the lower ring, the fixed strip being upwards connected to a fixed ring which is fixed at the mouth.

6. The pumping device of claim 5, wherein the pumping device further comprises a releasing mechanism which is switchable between a released position and a preloading position, wherein a level of the elastic member when the releasing mechanism is in the released position is higher than the level of the elastic member when the releasing mechanism is in the preloading position.

7. The pumping device of claim 1, wherein the pumping device further comprises a releasing mechanism which is switchable between a released position and a preloading position, wherein a level of the elastic member when the releasing mechanism is in the released position is higher than the level of the elastic member when the releasing mechanism is in the preloading position.

8. The pumping device of claim 7, wherein the releasing mechanism comprises a synchronizing collar, a first actuator is provided on the press head, a second actuator is provided on the synchronizing collar, and the releasing mechanism is switched between the released position and the preloading position under the interaction between the first actuator and the second actuator.

9. The pumping device of claim 8, wherein the first actuator is a first bump formed on the press head, a first bevel is formed on the first bump, the second actuator is a second bump formed on the synchronizing collar, a second bevel is formed on the second bump, and the first bevel matches with the second bevel.

10. The pumping device of claim 8, wherein the synchronizing collar is sleeved on the engagement sleeve, wherein a slot is formed in an inner surface of the synchronizing collar and a guide rail is formed on an outer surface of the engagement sleeve, and the guide rail matches with the slot, thus guiding movement of the synchronizing collar relative to the engagement sleeve in the longitudinal direction of the pumping device and preventing rotational movement of the synchronizing collar relative to the engagement sleeve.

11. The pumping device of claim 1, wherein the elastic member is made of plastics.

12. The pumping device of claim 1, wherein the movable part comprises: a press head; and a piston rod connected to the press head, wherein the press head is provided with a pressing flange, and a user is capable of pressing the pressing flange with his/her finger to apply a pressure to the press head;

the fixed part comprises: an engagement sleeve connected at a mouth of the container; the cylinder connected to the engagement sleeve, accommodated in the container and connected to the straw, the piston rod extending into the container; and wherein the one end of the elastic member abuts against or is fixed to the press head or the piston rod, and the other end abuts against or is fixed to the engagement sleeve.

13. The pumping device of claim 12, wherein a guide block is provided on the elastic member, a recess is formed in the engagement sleeve, and the elastic member is rotatable between a released position in which the guide block is located within the recess and a preloading position in which the guide block exits the recess such that the distance between the upper end and the lower end of the elastic member is reduced.

14. The pumping device of claim 12, wherein the elastic member is further formed with a synchronizing sleeve, and the press head comprises a lower press head ring sleeved on the synchronizing sleeve, wherein raised ribs are formed on one of an outer surface of the synchronizing sleeve and an inner surface of the lower press head ring, and grooves are formed in the other one of the outer surface of the synchronizing sleeve and the inner surface of the lower ring of the press head, and the raised ribs and the grooves match with each other such that the elastic member is rotatable together with the press head.

15. The pumping device of claim 12, wherein a lower sleeve is formed at a lower portion of the press head, and an upper sleeve is formed at an upper portion of the engagement sleeve, the lower sleeve and the upper sleeve match with each other to form an internal space in which the elastic member is accommodated.

16. The pumping device of claim 1, wherein a lower sleeve is formed at a lower portion of the press head, and an upper sleeve is formed at an upper portion of the engagement sleeve, the lower sleeve and the upper sleeve match with each other to form an internal space in which the elastic member is accommodated.

* * * * *